Figure 1:
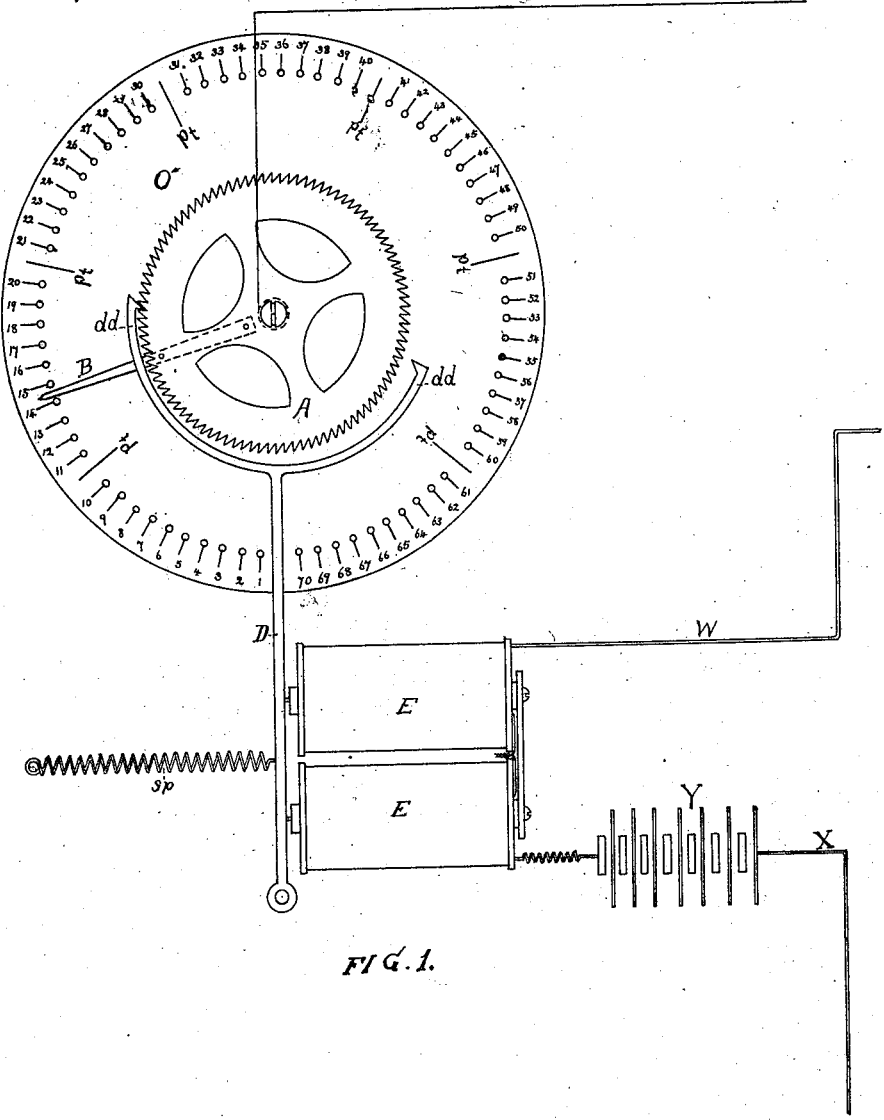

(No Model.) 3 Sheets—Sheet 1.

E. A. CLARK.
TELEPHONE SYSTEM.

No. 498,236. Patented May 30, 1893.

Witnesses:
James W. Martin
Ernest J. Lees.

Inventor:
Emery A. Clark
per Lawrence & Dwick
Attorneys (No Model.) 3 Sheets—Sheet 2.

E. A. CLARK.
TELEPHONE SYSTEM.

No. 498,236. Patented May 30, 1893.

Witnesses:
James W. Martin
Ernest J. Lees.

Inventor.
Emery A. Clark.
per Lawrence & Quick,
Attorney.

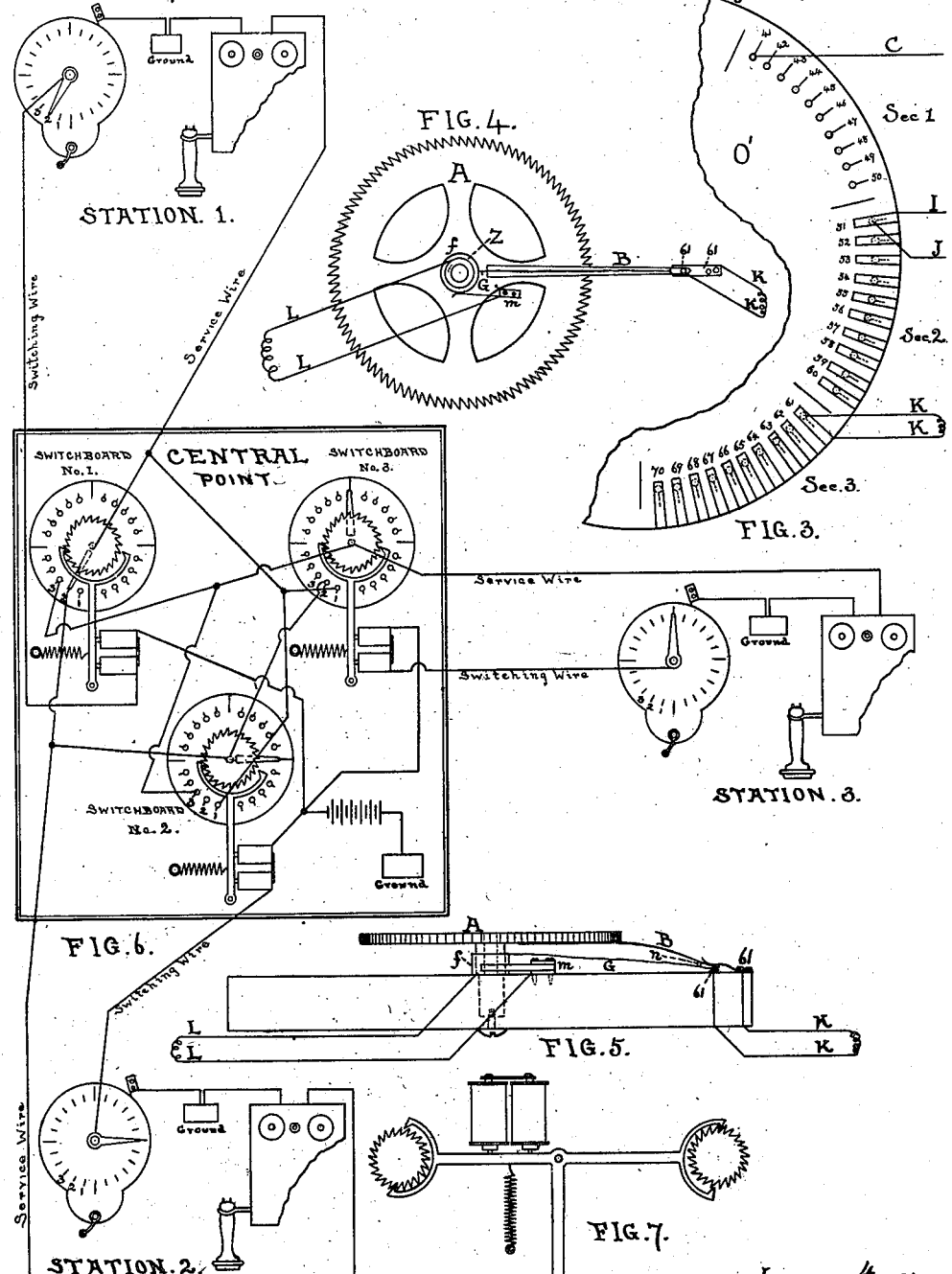

UNITED STATES PATENT OFFICE.

EMERY A. CLARK, OF SIOUX CITY, IOWA, ASSIGNOR, BY DIRECT AND MESNE ASSIGNMENTS, TO THE CLARK AUTOMATIC TELEPHONE EQUIPMENT COMPANY, OF SAME PLACE.

TELEPHONE SYSTEM.

SPECIFICATION forming part of Letters Patent No. 498,236, dated May 30, 1893.

Application filed April 5, 1892. Serial No. 427,961. (No model.)

*To all whom it may concern:*

Be it known that I, EMERY A. CLARK, a citizen of the United States, residing at Sioux City, in the county of Woodbury and State of Iowa, have invented a new and useful Electro-Mechanical Switch, of which the following is a specification.

My invention relates to improvements in modes and machines for switching currents of electricity from one telephone wire, telegraph wire, or other wire for the transmission of electricity to another wire, or to any one of a system of wires converging to a central point and enabling any person at any outlying station of any such telephone, telegraph or other similar system of electrical intercommunication to place himself in communication with any other outlying station in the system, without the assistance of any central office, but solely by the use of my invention, which consists of a dial near the circumference of which are numbered points corresponding in number to the number of wires desired to be operated in the system, the said dial being provided with a movable pointer or indicator which passes step-by-step over the numbered points aforesaid, said indicator being attached to, and moved by the rotation of, a wheel placed behind the dial, which wheel is provided with cogs equal in number to the numbered points above mentioned, which cogs, as the wheel is rotated make and break electric contacts and thus send electric pulsations through an electro-magnet, situated at the central point of the system. This electro-magnet is provided with an armature of novel and peculiar construction which, when the electro-magnet is not energized is held from contact with it by a spring, the tension of which is overcome by each of the pulsations above mentioned, giving to the armature an oscillating or to-and-fro motion, whereby a wheel is set in motion which carries a contact-spring over points of contact with every other wire in the system successively, at the will of the user. Each station is provided with one of the above mentioned switches, at central point. All switches are suitably interconnected and are operated in a manner herein after described by a common battery, also situated at central point and there grounded.

The objects of my invention are to enable the user, by means of the automatic action of my invention to put himself in communication with any other wire of a system by thus actuating his switch at the central point. I attain these objects by the mechanism illustrated in the accompanying drawings, in which—

Figure 2:
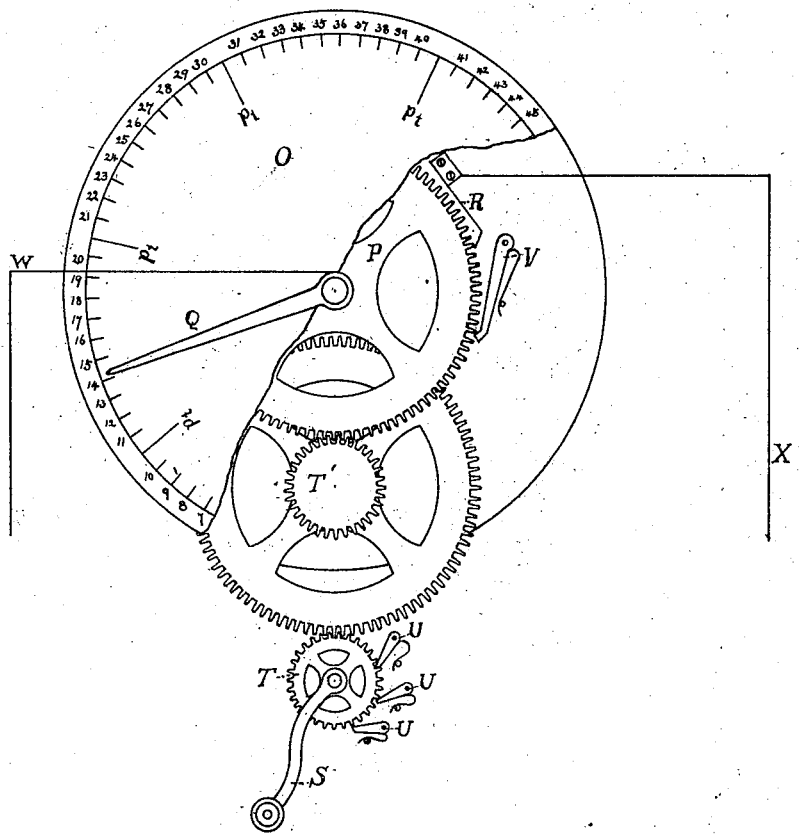

Figure 1 is a front view of the switch at central point, showing the wires, battery and other mechanism intimately connected with it, which operate it. Fig. 2 shows the dial at user's station, partly broken away to display mechanism underneath. Fig. 3 shows a modification of the arrangement of numbered contact points in Fig. 1 to adapt the invention to three different uses. Fig. 4 shows under side of switch-wheel with additions necessary in using the invention in systems having metallic circuits. Fig. 5 shows a side view of mechanism shown in Fig. 4. Fig. 6 shows instruments at central point, their connections and three outlying stations in diagram. Fig. 7 shows modification of armature-lever for special purposes.

Similar letters and figures refer to similar parts throughout the series of views.

In the following specification in referring to lines and instruments used for the actual work of electrical intercommunication, as telegraph and telephone lines and instruments, I call them "service-lines," "service-instruments," &c.; using the term "switching-lines," &c., to designate those parts of the system used for making connections between "service-lines."

The mechanism used directly by the operator is shown in Fig. 2, and is set in operation by the hand or other power applied to the rotation of breaking-wheel P preferably by means of the series of cog wheels T T and P (though obviously breaking-wheel P is the only one essential to my invention) actuated by the crank S, the purpose of this gearing being to give the wheel P and the indicator Q a slower movement than they would otherwise have, thus decreasing the probability of the operator's moving the mechanism past the desired point, and by this slower movement rendering the working of the mechanism in Fig. 1 more regular, accurate and reliable.

W is a switching-wire running from magnet E E at central point to breaking-wheel P at outlying station and connected to the bearing of wheel P as shown in Fig. 2.

X is a return or ground wire connected with ground spring R. Whenever a contact is made between ground-spring R and wheel P a circuit is completed through electro-magnet E E, common battery Y, switching-wire W, breaking-wheel P, ground-spring R, and wire or ground X. Spring R is so adjusted as to touch only the tips of the cogs of wheel P as said wheel is revolved, so that when wheel P is set in motion, during each of its revolutions this circuit is completed and broken as many times as there are cogs on its periphery.

V is a spring-dog so shaped and adjusted as to press between the cogs of wheel P and give it a step-by-step motion with pauses or halts when the point of dog V presses between two cogs. The mechanism is so adjusted that each of these steps forward carries indicator Q forward a distance equal to the space between two of the points on the dial, and so that when the pauses or halts occur the indicator pauses directly over one of the numbered points or one of the blanks or resting-points *pt* and so that at each pause or halt of wheel P spring R is disengaged from wheel P (and circuit consequently broken) by reason of its point standing between two cogs.

The dogs U U U are so adjusted as to prevent any backward movement of the mechanism, thus preventing any contacts from being made between ground-spring R and breaking-wheel P except by a forward movement of the mechanism.

As wheel P revolves its cogs coming in contact with spring R make and break electric contacts, sending electrical pulsations from battery Y through electro-magnet E E. Armature D, when the circuit is broken, is by the tension of spring *sp* disengaged from magnet E E, but when the circuit is completed it is drawn by electro-magnetic attraction against the ends of the magnet E E, as shown in Fig. 1, and on the circuit being broken spring *sp* draws it back again. Thus as the mechanism shown in Fig. 2 is operated armature D constantly oscillates to and fro, and in my invention, this motion is communicated to switch-wheel A, giving it a rotary motion. I prefer to accomplish this by means of the peculiar formation of that end of armature D which is next wheel A (the other end being hinged or fulcrumed as shown in Fig. 1) which peculiar formation consists in furnishing armature D with a bifurcation or straddle ending in two pawl-like points *dd, dd*, situated on opposite sides of the periphery of wheel A, and so shaped and adjusted that as armature D moves back and forth, the points *dd, dd* are alternately driven between the teeth with which the periphery of wheel A is furnished. These teeth are all made to slope in one direction, and points *dd dd* are so shaped and adjusted that, in being so driven against the sloping sides of said teeth their pressure on the slopes of said teeth constantly urge wheel A forward and cause it to revolve. Thus wheel A is propelled and controlled by armature D, which is actuated in part by the tension of spring *sp* and in part by the attraction of magnet E E. It is obvious that this armature may have its hinge or fulcrum at any part of its length or on a projection furnished for it, and that both ends may be forked or bifurcated for the purpose of propelling an additional wheel, and these bifurcations may be increased to drive still other wheels as desired as shown in Fig. 7.

Wheel A is placed in the center of a circle of contact-points insulated from each other on the switch board O′ which are numbered to correspond with the numbered points on the dial O, Fig. 2—in this case from 1 to 70— (but obviously any desired number may be used), and this circle of contact points is furnished with the blanks or resting-points *pt* in exactly the same manner as is the dial O aforesaid. Wheel A has attached to it and carries with it a metallic contact-spring B and is connected by service wire C with telephone, telegraph or other instrument at outlying station more or less remote where dial O Fig. 2 is situated. Each outlying station of the telephone, telegraph or other system in which my invention is used is furnished with a switch-board O′ and these switch-boards are preferably collected and suitably interconnected at some central point. Each service-wire in the system runs to central point and is there connected to its own wheel A on its own switch-board O′ and also by branches to its own numbered contact point on all other switch-boards. Thus station 1 is connected by its service-wire to its own switch-wheel at central point, and also to point 1 on all other switch-boards. Station 2 is connected to its own switch-wheel, and to point 2 at all other switchboards, and so on through the entire system as is clearly shown in diagram Fig. 6.

The mechanism is so adjusted that when the electrical circuit is broken in the revolution of wheel P, armature D is released from magnet E E and drawn back by spring *sp*. By the action of the points *dd* wheel A is propelled forward and stopped with contact-spring directly over and resting and pressing upon one of the numbered points on the switch-board O′. A circuit is thus formed through service wire C, wheel A, contact-spring B, and the service wire in the system corresponding in number to the number of the contact point on switch-board O′ covered by spring B.

To illustrate the mode of using and operating my invention, I will suppose it applied to a telephone exchange of say, for simplicity, three members, as shown in Fig. 6. In this figure, for greater clearness, the different parts of the diagram are indicated by words instead of letters. The outlying stations are marked "Station 1," "Station 2" and "Station 3;" the switchboards at central point are marked "Switchboard No. 1," "Switchboard No. 2" and "Switchboard No. 3." From the magnet of each switchboard as shown, the wire marked "Switching-wire" running to dial at outlying station, and from each switch-wheel runs the wire marked "Service-wire" to telephone at outlying station. From each wire marked "Service-wire" branches are clearly shown running to a properly numbered contact-point on each other switchboard. Each subscriber is supplied with a dial O and is connected with his own switch-board O' at a central point, and the indicator stands at a point on dial O corresponding in number to the number of the contact point or blank covered by spring B on switch-board. The operator (say No. 1) wishes to communicate with another member of the exchange; say No. 2. To do this he turns the crank 3 until the indicator Q reaches the number 2. During this operation electric contacts have been made and broken corresponding in number to the number of cogs of breaking-wheel P which have passed ground-spring R and also corresponding in number to the number of numbered points on the dial O traversed by indicator Q. By these electric pulsations acting through the magnet E E aided by spring sp the armature D has propelled forward the switch-wheel A and brought the contact-spring B to a contact-point on switch-board O' exactly corresponding to the numbered point covered by the indicator Q on dial O, and the operator's telephone is placed in communication with telephone No. 2 in the system, through their respective service-wires as shown in Fig. 6. And any telephone in the system may be placed in communication with any other in the same manner. On discontinuing the connection the operator moves his indicator Q forward to any resting-point pt thus moving contact-spring forward to a corresponding blank pt on switch-board O' and the instruments are disconnected for leaving out of use. In a manner similar and substantially as above described my invention may be applied to other systems.

In Fig. 3 the switch-board O' is represented as divided into sections each section being put to a different use. Section 1 shows method of using my invention the same as above set forth, C representing service-wire.

In section 2, Fig. 3 is shown the method of making and breaking contacts when switch-board O' is used on circuits which are grounded by working in through an annunciator or bell. The numbered points on switch-board O' from 51 to 60 inclusive are in this case flat springs. I represents service-wire from numbered spring to operating-point where dial O is located. The numbered springs rest on under contact-points indicated in Fig. 3 by dotted lines on numbered springs; these under contact-points are connected to ground through annunciator or bell by wire J in the usual manner. When the mechanism is operated as above set forth, spring B slides under the numbered springs and being stopped at any one of them makes a contact with it and at the same time raises the numbered spring and breaks contact of numbered spring with under contact point; when spring B is moved, the numbered spring returns to its place on contact point restoring original circuit to exchange or system.

To use my invention on systems having metallic circuits, I modify wheel A and spring B as shown in Fig. 4. F is a metallic collar or commutator insulated from wheel A by the interposition of insulation Z. G is a metallic spur or conductor preferably covered with insulating material, except at the end, which is left bare for a contact point, but is insulated from spring B as shown at n Fig. 5. L L are wires of metallic circuit, one end connected with wheel A, the other connected with commutator f through commutator-spring m which bears on commutator f. K K are wires which when brought in connection with L L by the mechanism are thrown into a circuit with L L.

In Figs. 3, 4 and 5 K K are shown connected with numbered contact-spring and under-contact-point 61 and 61. When the mechanism is moved as aforesaid and spring B is stopped under any numbered contact-spring (61 in this case) a complete metallic circuit is formed through the wires L L and K K and the commutator spring in the insulated collar f the insulated conductor g, the insulation Z and n keeping the two sides of the circuit from contact with each other.

In Fig. 5 the commutator or insulated collar f, the commutator-spring m, the insulation n and the under and upper contacts 61 and 61 are more plainly shown than in any of the other drawings.

I am aware that various inventions have been devised for the purpose of automatically connecting the various lines of telephone and other electrical systems. Therefore I do not claim such an invention broadly, but, I do claim as my invention, and desire to secure by Letters Patent, the following:

1. In a system of electrical intercommunication, a system of service lines converging from outlying stations to a central point, and having at said central point each service-wire connected by a branch thereof to its own switch-wheel, and by other branches thereof to a terminal point, as shown, on every other switchboard in the system, in combination with an accompanying system of switching lines, consisting of one switching wire from each of the said outlying stations, converging to the same central point, and there grounded through a common central battery, said switching system being electrically unconnected with and independent of said service system; all in combination with connecting mechanism so arranged and disposed at the point of convergence of said switching lines, and at the outlying terminals thereof, as to be capable of being so manipulated from outlying stations that any one of said service lines may at will, by said mechanism, actuated by said switching system, be automatically placed in electric circuit with any other service line of the system, substantially as above set forth, and for the purposes specified.

2. In a system of electrical intercommunication, a system of service lines or wires converging to a central point, a system of switching lines or wires consisting of a single wire, converging as shown from each of the same outlying stations to the same central point, said system of switching wires being electrically unconnected with said system of service wires, a common central battery at central point, through which said switching wires are grounded; all in combination with connecting mechanism consisting at each outlying station of the system of a dial provided with an indicator moving over its surface in obedience to the rotation of a metallic breaking-wheel, which is electrically charged through its switching wire by said common battery at a central point, and so formed that portions of its surface in its rotation make and break contacts, with a suitable ground connection provided therefor, thus sending a determinate number of electrical impulses through switching-wire and an electro-magnet connected therewith at central point, which, when thus energized, by means of the bifurcation with pawl-shaped points of a spring-controlled armature, actuates one of a system of suitably interconnected switchboards at central point; said number of electrical impulses being indicated by the number of properly designated points passed over by said indicator on said dial, said service-wires each terminating as shown, in a switch-wheel on its own switchboard, after sending off a branch to each of the other switchboards in the system, thus interconnecting all the switchboards as aforesaid; all substantially as above set forth, and for the purpose of automatically placing the service wire of said outlying station in electric circuit with any other service-wire in the system at the will of the operator at any outlying station.

3. In an automatic system of electrical intercommunication, a system of service-lines converging from numbered (or otherwise designated) outlying stations to a central point, each service-wire terminating at a central point in as many normally open branches as there are outlying stations in the system, one of said branches connected to its own switchboard, the other branches each terminating in a contact-point (bearing the number of the outlying station from which it runs) on one of the other switchboards, all switchboards being thus grouped and interchangeably interconnected by each having a suitable contact-point terminal of every service-line in the system (except its own), said contact-points being so disposed about the switch-wheel as to be successively circuited with the switch-wheel, and its service-wire, because of a contact spring in circuit with and carried by said switch-wheel, making contacts with each of said contact-points in succession as said switch-wheel is revolved, in combination with a system of switching wires converging from each of the same outlying stations to the same central point (said switching system being in no manner electrically connected with said service system), each switching wire passing at a central point through an electro-magnet to a common grounded battery and furnished at its outlying-station-end with a normally open ground connection and suitable mechanism for making and breaking the same for the purpose of sending through said electro-magnet a determinate number of electrical impulses, thus by the action of a suitably connected spring-controlled armature to said electro-magnet propelling the switch-wheel forward a determinate number of steps, carrying its contact-spring to a desired contact-point with any other desired service-wire; substantially as above set forth, and for the purposes specified.

4. In an automatic system of electrical intercommunication, a system of service-wires grounded through service instruments at outlying stations and converging to a central point, but never grounded at such central point, in combination with a system of automatic switches grouped at a central point and so interconnected by the terminals of service-wires that by means of its automatic switch any service-wire may be placed in electric circuit with any other service-wire, neither the service-wire nor the circuit, when established, ever passing through any magnet or coil of any description at central point, either before or after connection; all in combination in the same system with a system of switching wires, terminating at outlying stations in normally open ends, capable of being intermittently grounded by the rotation of a breaking-wheel and converging (one from each outlying station), each to an electro-magnet at central point, and thence to a common grounded battery, forming circuit through said electro-magnets; suitable mechanism at outlying station for regularly breaking and closing these circuits, thus actuating spring-controlled armatures with which said electromagnets are provided, said armatures being of suitable construction, adapting them to the propulsion of the aforesaid automatic switches containing the terminals of the service wires; all substantially as above set forth, and for the purposes specified.

5. In an automatic system of electrical intercommunication, a system of service-wires converging out from each outlying station to a central point, and never grounded except through service instruments at the outlying stations, and without coils or magnets at central point; in combination with an electrically distinct, independent and unconnected system of switching wires (in number equal to service-wires), forming circuits (normally open at outlying ends) from a central grounded battery through electro-magnet at central point, and suitable mechanism for intermittently closing the switching circuit at outlying stations by a mechanically-interrupted ground-connection, together with a system of switches at central point, which are suitably interconnected by each service-wire of system ending at central point, in as many branches as there are stations in the system, one of which branches is connected with its own switch-wheel on its own switchboard; the other branches running one to each of the other switchboards, and there ending, as shown, in a suitable contact-point terminal; which switches, when actuated by the spring-controlled armature with which said magnets are provided, effect the automatic connection of the service-wires of any desired two of the outlying stations, substantially as above set forth.

6. In automatic electro-mechanical switches, a switchboard having a centrally located switch-wheel connected to a wire capable of being grounded through a service-instrument at a point more or less remote, and carrying a contact-spring, which, as said switch-wheel rotates, makes contacts with each one in a succession of any desired number of metallic contact-points, which are insulated from each other and so disposed about said switch-wheel as to be in the path of said moving contact-spring, each of said contact-points being the terminus of a service-wire, grounded at a more or less distant point, each being placed in electric circuit with the wire connected to the switch-wheel when the contact-spring makes a contact with its contact-point terminus; service-wires passing, one from each service-instrument at outlying station, to central point, and there ending in as many branches as there are stations in the system, the arrangement of said branches being such that one runs to the switch-wheel corresponding in number or designation to the station with which it is connected, and each of the remaining branches runs to a contact-point having the same number or designation on one of the remaining switchboards; in combination with the spring-controlled armature of an electro-magnet, said armature being hinged or pivoted at one of its ends, and at the other end bifurcated so as to straddle the switch-wheel, said bifurcation being furnished with pawl-shaped points adapted to engage the sloping teeth with which the periphery of the switch-wheel is furnished, the adjustments of the parts being such that as the electro-magnet is alternately energized and de-energized by the make and break of an electric circuit passing through it, the alternate action of the magnet and the opposing tension-spring causes the pawl-like points to engage the sloping teeth of the switch-wheel and urge it forward with step-by-step movement, the steps being made alternately by the action of the magnet and tension-spring, the adjustment being such that in either position of the armature, one or the other of its pawl-like points is in engagement with the switch-wheel, and whenever the magnet is de-energized the contact-spring is in contact with some one of the contact-points or on a blank or resting-point on the switchboard; all substantially as set forth, and for the purposes specified.

7. In a system of electrical intercommunication consisting of two or more stations, each provided with a service-wire and a switching wire passing from the station to a central point, to which point all wires converge; service-instruments at stations, through which service wires are adapted to be grounded; service-wires passing, one from each service-instrument to central point, and there terminating in as many normally open branches as there are stations in the system; at central point, for each station a switchboard, numbered or otherwise designated to correspond with the station with which it is connected by the service-wire from said station; in each switchboard, a centrally located switch-wheel, adapted to turn on its axis, and provided, as shown, with sloping, pointed teeth on its periphery; a contact-spring rigidly, radially attached to said switch-wheel; on each switchboard a contact-point-terminal of every service-wire in the system, except its own, said contact-points being so disposed about the switch-wheel as to be in the path of the contact-spring as the switch-wheel is revolved, and thus successively circuited with it; for each switch-wheel an electro-magnet, through which a switching wire passes from its station to a common grounded central battery; an armature to each electro-magnet, shaped as shown, and hinged at one end, and at the other bifurcated and provided with two pawl-shaped points adapted to engage the teeth of the switch-wheel, which it straddles; a tension-spring operating to draw the armature from its magnet when the magnet is de-energized; at the station-end of each switching wire a breaking-wheel, adapted to rotate, and in rotating, to make and break the circuit through switch-wire and connections by its cogs touching a suitable ground-spring provided therefor; an indicator attached to and rotating with said breaking-wheel, and a dial over which the indicator moves, provided with the names or numbers of the stations of the system, and with blanks or resting points as shown; suitable wheel-work for actuating the breaking-wheel and indicator, and pawls to prevent backward motion; a spring-dog to give the indicator a step-by-step motion; said switching wires being electrically unconnected with the service-wires; all in combination substantially as set forth, and for the purposes specified.

8. In a system of electrical intercommunication, consisting of outlying stations, from which wires converge to connecting mechanism at a central point, said connecting mechanism consisting of a switchboard O' for each outlying station, said switchboards being interchangeably interconnected; on each switchboard a centrally located switch-wheel A, carrying the contact-spring B over and into contact with numbered or otherwise designated contact-points, equal in number to the stations in the system; electro-magnets E E, provided with spring-controlled armatures D, bifurcated and adapted to straddle the switch-wheel, and provided with the pawl-like points dd dd; the resting points pt, the service-wire C running from switch-wheel to outlying station, and the wire W running from a central main battery Y through said electro-magnet to circuit-breaking mechanism at outlying station; at each outlying station the breaking-wheel P in circuit with said switch-wire, and adapted to make and break contacts with ground-spring R; wire X and ground-spring R adapted to intermittently complete said circuit; the indicator Q rigidly fixed to the axis of said breaking-wheel and moving with it; the spring-dog V adapted to give said breaking-wheel and indicator a step-by-step motion; suitable wheel-work, as the wheels T and T', for actuating said breaking-wheel; suitable means, as the hand-crank S, for actuating said wheel-work; detent-dogs, as U U U, for preventing backward motion of said mechanism; the dial O provided with points and blanks pt, corresponding in number and position to the contact-points and blanks on the switchboard O'; branches of each service-wire at central point, one of said branches connecting to said service-wire's own switch-wheel, the other branches being so disposed that a branch terminates in its own numbered contact-point on every other switch-board; the metallic collar F insulated from wheel A by insulation Z; the metallic spur G; the insulation n interposed between contact-spring B and spur G, and the commutator-spring m; all in combination substantially as above set forth, and for the purposes specified.

9. In an automatic system of electrical intercommunication, a system of switching lines diverging from a grounded battery at central point through electro-magnets, also at central point, to normally open ground connections at outlying stations, (which are also the outlying stations of a system of service-lines converging to some central point;) in combination with a breaking-wheel in the switching circuit at each outlying station, said breaking-wheel being adapted to turn upon an axis, and provided with cogs, for the double purpose of making and breaking the switching circuit by alternate contact with and disengagement from a suitable spring ground-connection, so placed as to touch the tips of said cogs as the breaking-wheel is revolved, and also of furnishing a means of rotating said breaking-wheel by a suitable train of wheel-work and a hand-crank, said breaking-wheel cogs being also acted upon by a spring-dog to the effect of giving said breaking-wheel, and an indicator mounted upon and moving with it, a step-by-step movement, said indicator moving over a dial with numbered or designated points, and any desired number of blanks or resting points thereon, and at each step passing from one of said points to the next in succession; said numbered points corresponding in number to the outlying stations in the system; said breaking-wheel or its actuating train of wheel-work being also provided with a suitable number of dogs to prevent any backward movement of the breaking-wheel; all in combination with a suitably constructed, spring-controlled armature to the aforementioned electro-magnet, which is thrown into oscillation by the interruptions of the switching-circuit during the rotation of the breaking-wheel, thereby actuating a switch-wheel in circuit with the service-wire from the same outlying station, said switch-wheel carrying a contact-spring over numbered contact-points and blanks corresponding in number and order with the points and blanks on the dial at outlying station, the mechanism being so adjusted that the contact-spring on the switch-board at all times rests upon the contact-point or blank corresponding to the numbered point or blank pointed to by the indicator on the dial, and so that the contact-spring may be moved to any desired contact-point or blank by actuating the mechanism at outlying stations so as to move the indicator to a corresponding point or blank on the dial; the terminals of each service-wire in the system being connected to its properly numbered contact point on each switchboard except its own, afford means for the outlying station being automatically connected with any other outlying station through their service-wires, and each station being in like manner connected to every other station by its own dial and switchboard and switching-wheel, furnishing a complete system of intercommunication; substantially as above set forth, and for the purposes specified.

EMERY A. CLARK.

Witnesses:
J. H. QUICK,
R. B. BICKERTON.